April 5, 1966  L. E. ORR ET AL  3,244,547
COATED VEHICLE GLAZING CLOSURES
Original Filed May 19, 1955

INVENTORS
LEIGHTON E. ORR
WILLIAM O. LYTLE and
BY ARNOLD E. SAUNDERS

Oscar L. Spencer
ATTORNEY 3,244,547
COATED VEHICLE GLAZING CLOSURES
Leighton E. Orr, Tarentum, William O. Lytle, New Kensington, and Arnold E. Saunders, Saxonburg, Pa., assignors to Pittsburgh Plate Glass Company, Pittsburgh, Pa., a corporation of Pennsylvania
Continuation of abandoned application Ser. No. 509,552, May 19, 1955. This application July 2, 1962, Ser. No. 206,678
7 Claims. (Cl. 117—33.3)

This application is a continuation of application Serial No. 509,552 of Leighton E. Orr, William O. Lytle, and Arnold E. Saunders, filed May 19, 1955, for Method of Producing Coated Glass Articles and now abandoned.

This invention relates to an improved window closure having a metal oxide coating of non-uniform thickness sufficiently transparent to light throughout its extent to permit vision therethrough to provide a heat or light screen whose absorption properties vary according to a desired pattern. Although articles having such films are useful in many fields, they have been found to be especially useful as windshields or viewing closures in automobiles, aircraft, trains and similar motive vehicles.

In production of such articles, a glass sheet, usually of plate glass or other flat glass structure (including bent or curved glass structures), is heated to the temperature at which application of the metal oxide coating may be effected, for example, above about 400 to 800 degrees Fahrenheit but below the fusion point of glass. Usually, 950 to 1150 degrees Fahrenheit is the temperature range selected.

When the glass has been heated as described above, for two or more minutes, it is withdrawn from the heating chamber and immediately sprayed with the coating solution before substantial cooling of the glass sheet can take place. A quantity of the coating solution is placed in an atomizing spray gun and the heated glass sheet is sprayed with an atomized spray of this material. Ususally this spraying operation is conducted in air of atmospheric humidity or oxygen. However, coatings have been obtained even when oxygen appears to be absent, although it is probable that oxygen, either from the atmosphere or combined in water or similar compound, is present. This process results in the production of a base coated with a metal oxide film. The film is integrally united directly with the glass surface but not intermingled with the glass.

Articles produced according to the above description, further details of which will be supplied below, are suitable for use as viewing closures or windows. Usually they are laminated with a suitable plastic such a polyvinyl butyral to reinforce the glass and provide a so-called "safety glass" construction.

It has been found that when stannic chloride or like film forming compound is sprayed upon a hot glass surface even for a relatively short period of time during which the surface is cooled to below film forming temperature, the resulting transparent film is essentially uniform in thickness even though the density of the spray is not uniform. Also, it has been discovered that when a spray of nonuniform density is used, a film of nonuniform thickness may be obtained if the spraying operation is interrupted early enough and before essentially uniform film thickness has been achieved.

Thus, by using this method of providing a refractory base of nonuniform curvature with a transparent film of prescribed nonuniform transparency in a single spraying operation, a new article has been produced. According to this method, a heated refractory base is sprayed with a suitable film forming composition while maintaining a spray pattern of nonuniform density, i.e., a spray pattern which is more concentrated at certain portions thereof than at other portions thereof, and the spraying is discontinued after an essentially continuous film has been formed but before the temperature of any portion of the base subjected to the film forming composition falls below minimum film forming temperature.

The spraying operation must be conducted within certain critical limits in order that a film of nonuniform thickness can be obtained. If the spraying operation is continued too long, the amount of film formed on all portions of the heated base tends to be uniform and a film of substantially uniform thickness is formed. Therefore, the complete spraying operation must be conducted within a matter of only a few seconds.

The amount of film which can be formed on the base is a function of the amount of spraying solution brought into contact with the base while the base is at film formation temperature. Thus in order to achieve a transparent film of nonuniform thickness by use of a spray pattern of nonuniform density, the spraying must be performed within certain limits insofar as the amount of film forming solution which is brought into contact with the heated base is concerned. This amount varies from an amount sufficient to form an essentially continuous film, to an amount which is less than an amount necessary to form a maximum amount of film on all portions of the heated base. It is to be understood that if the spraying operation is continued up to or beyond this point of maximum film formation, a film of substantially uniform thickness is formed. This undesirable result is accomplished because while the areas of the base exposed to the dense regions of the spray are cooled below film forming temperature, other areas of the base exposed to the sparse regions of the spray are still above the minimum film forming temperature. Therefore, the film continues to form in the other areas, unless the spraying is discontinued or the exposure of the base to the spray otherwise stopped before any area is cooled to below minimum film forming temperature by virtue of contact with the spray.

It is known that the amount of film formation is also affected by the ingredients of the spraying solution, the humidity of the spraying atmosphere and the temperature of the base when sprayed, but such effects are not of great importance in achieving a film of nonuniform thickness by a single spraying operation for they exert the same effect on all portions of the film, thereby tending to affect different areas of the sprayed base in an equal amount.

The films formed by such spraying techniques are not limited to those consisting essentially of tin oxide, as described above. Films of indium oxide, cadmium oxide, zinc oxide and other metallic oxides and mixtures of these oxides with each other and with minor amounts of other oxides having the desired pattern of nonuniform transparency may be produced by spraying solutions of the proper metal salts or mixtures thereof on heated glass plates. The principles enunciated above may be utilized to provide films containing these other oxides and having the desired non-uniform thickness.

Metal oxide films formed by spraying suitable metal compounds onto a heated refractory base are disclosed in Mochel Patent No. 2,564,708, the disclosure of which is incorporated by reference in the present application. The utility of these latter films lies primarily in their ability to screen out part of the heat and light that would otherwise pass through a sheet of glass used as a viewing closure.

In automotive window where the glass extends into the automobile roof, it is especially important that the roof portion of the glass be covered thickly to provide a film portion that has relatively low transparency to heat yet is still sufficiently transparent to light to permit vision throughout and that the thickness of the coating be decreased along an axis extending from the roof to the hood of the vehicle to provide a tapered screening effect. The glass should be essentially free of said coating at the eye level of the driver or passenger to permit unobstructed vision through the wondow closure.

It may also be desirable to increase the screening effect at the lowest region of the glass in order to absorb light and heat reflected from the road and the vehicle hood. Side lights of buses preferably have spaced dark upper and lower bands to protect the passengers from both direct and reflected sunlight, while providing an intermediate clear area for unobstructed vision of the landscape.

Accomplishment of the foregoing constitute some of the principal objects of the invention, others of which will become apparent by reference to the ensuing description, taken in conjunction with the accompanying drawings, in which.

Figure 1:
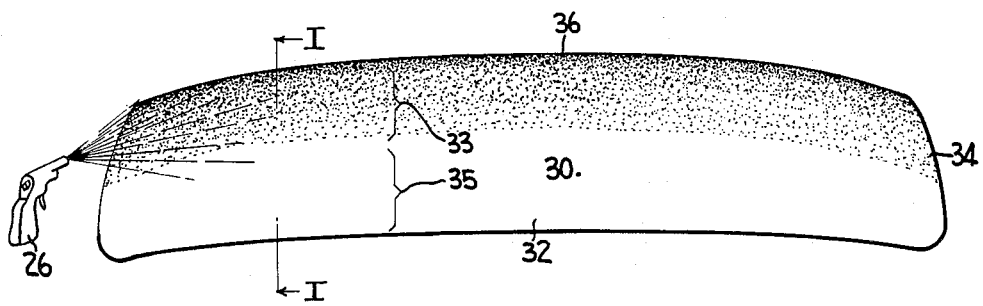
FIG. 1 is a diagrammatic perspective view of a method of preparing a glass panel according to this invention, wherein the panel is provided with a film of feathered thickness required for varying transmission properties.

Nonuniform thickness films of metal oxide sufficiently transparent to light to permit vision therethrough throughout their extent may be produced according to the present invention by first heating a glass sheet to the temperature at which formation of the metal oxide coating may be effected, for example above about 600 to 800 degrees Fahrenheit but below the fusion point of the glass, usually 950 to 1250 degrees Fahrenheit.

When the glass has been heated for one, two or more minutes, it is withdrawn from the heating chamber and immediately is sprayed with the coating solution before substantial cooling of the glass sheet can take place. In this operation, a quantity of the coating solution is placed in an atomizing spray gun and the heated glass sheet is sprayed with an atomized spray of this material for a brief period.

Metal oxide films on glass panels are suitable for absorbing a proportion of light and other radiation incident on the panel. Various metal oxide films are capable of producing the desired results. By applying metal salt solutions capable of forming these metal oxide films or certain mixtures thereof according to the teachings of the present invention films having nonuniform transparency to light and heat result.

The most suitable metal oxide coatings for this purpose are those containing tin oxide, indium oxide, cadmium oxide, or mixtures thereof, mixtures of tin oxide and antimony oxide with or without minor additions of the oxides of bismuth, iron, zinc, copper, vanadium, chromium, manganese, cobalt or mixtures thereof, iron oxide films with or without minor proportions of tin oxide, titanium oxide films, and cobalt oxide films such as described in U.S. Patent No. 2,688,565 to Richard F. Raymond. Specific solutions used to formulate sprays which form metal oxide films upon contacting heated glass bases are listed in Table I. The invention is not limited to these particular spraying solutions, because the principles of forming a nonuniform film may be utilized with any film forming composition which must be sprayed onto a heated refractory base to react at the surface of the base to form the necessary colored metal oxide film.

The solutions listed in Table I provided films having uniform thickness. However, these films are susceptible of being imparted in varying thicknesses if the spraying solution is applied in a nonuniform dispersion and the duration of exposure time of the heated glass base to the spray is limited according to the teachings mentioned above.

TABLE I

| | Solution Formulation (Salts) (Solvent) | Percent Metal Oxide | L* | E* | Transmitted Color of Film |
|---|---|---|---|---|---|
| I-1 | 73.2 g. SnCl₄<br>27 g. SbCl₃<br>75.6 g. H₂O<br>10 g. HCl | $SnO_2$ 71.2%<br>$Sb_2O_3$ 28.8% | 10% | 19.5% | Dark blue. |
| I-2 | 73.2 g. SnCl₄<br>15.5 g. SbCl₃<br>70.6 g. H₂O<br>15 g. HCl | $SnO_2$ 80.9%<br>$Sb_2O_3$ 19.1% | 20% | 25% | Dark blue-purple. |
| I-3 | 73.2 g. SnCl₄<br>3.3 g. SbCl₃<br>70.6 g. H₂O<br>15 g. HCl | $SnO_2$ 95.4%<br>$Sb_2O_3$ 4.6% | 59% | 39% | Light blue. |
| I-4 | 73.2 g. SnCl₄<br>6.9 g. SbCl₃<br>6.8 g. BiCl₃<br>70.6 g. H₂O<br>15 g. HCl | $SnO_2$ 82.6%<br>$Sb_2O_3$ 7.6%<br>$Bi_2O_3$ 9.8% | 27% | 15% | Blue-black.<br>Quite neutral. |
| I-5 | 73.2 gms. SnCl₄<br>7.7 gms. SbCl₃<br>12.8 gms. BiCl₃<br>70.6 gms. H₂O<br>15 gms. HCl | $SnO_2$ 74.7%<br>$Sb_2O_3$ 8.7%<br>$Bi_2O_3$ 16.6% | 24% | 22% | Olive green-brown. |

TABLE I—Continued

| | Solution Formulation (Salts) (Solvent) | Percent Metal Oxide | L* | E* | Transmitted Color of Film |
|---|---|---|---|---|---|
| I-6 | 132 gms. SnCl$_4$<br>36.1 gms. SbCl$_3$<br>7.8 gms. FeCl$_3$ 6H$_2$O<br>70.6 gms. H$_2$O<br>15 gms. HCl | SnO$_2$ 75%<br>Sb$_2$O$_3$ 22.7%<br>Fe$_2$O$_3$ 2.3% | 26% | 25% | Neutral blue-green. |
| I-7 | 132 gms. SnCl$_4$<br>36.1 gms. SbCl$_3$<br>73.5 gms. FeCl$_3$ 6H$_2$O<br>70.6 gms. H$_2$O<br>15 gms. H$_2$O | SnO$_2$ 62.9%<br>Sb$_2$O$_3$ 19.2%<br>Fe$_2$O$_3$ 17.9% | 55% | 42% | Light green. More iron causes spots. |
| I-8 | 45 gms. FeCl$_3$ 6H$_2$O<br>45 gms. methanol | Fe$_2$O$_3$ 100% | 47% | 48% | Amber transmission. This film cuts transmission by high reflection. |
| I-9 | 45 gms. FeCl$_3$ 6H$_2$O<br>3 gms. SnCl$_4$<br>45 gms. methanol<br>5 gms. HCl | Fe$_2$O$_3$ 86.5%<br>SnO$_2$ 13.5% | 51% | 46% | Amber color. |
| I-10 | 30 gms. TiCl$_4$<br>70 gms. methanol | TiO$_2$ 100% | 62% | 60% | Amber transmitted light silvery reflection. |
| I-11 | 20 gms. cobalt acetate 4H$_3$O<br>20 gms. H$_2$O | CoO 100% | 9% | 26% | Amber. |

*L is luminous transmittance determined by Weston light meter.
*E is total energy transmittance determined by Radiomatic head.

Figure 2:
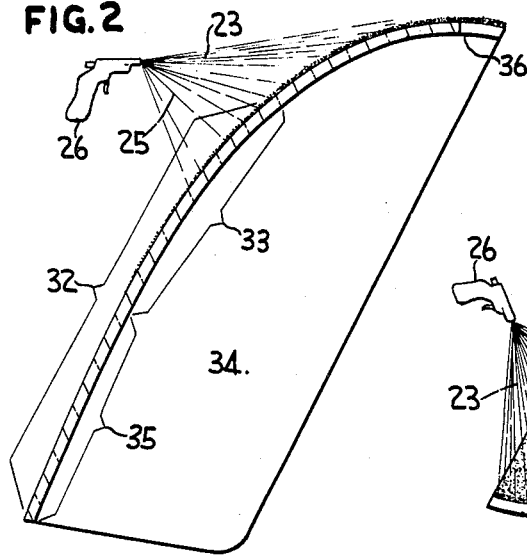
FIG. 2 is a diagrammatic sectional view of a panel treated as shown in FIG. 1 and taken along the lines I—I of that figure.

Referring in particular to FIGS. 1 and 2, an automobile window panel 30, which may comprise a single light of glass or a number of glass sheets with a thermoplastic interlayer, may be coated in accordance with the teachings of the present invention to produce a coating having a thickness variation along an axis transverse to the axis of relative movement between the central axis of the spray and the glass, producing a vertically graded density when the panel is mounted in an automobile. The density of the sprayed coating in the automobile windshield is substantially uniform along any horizontal axis, which coincides substantially with the axis of relative movement between the glass panel and the spray.

Panel 30 is provided with a center portion 32 adapted to extend transversely of an automobile and to merge at each longitudinal extremity into side portions 34. The latter are curved relative to the center portion about axes extending transversely of the panel to extend from the center portion in vertical planes substantially perpendicular to the plane tangential to the center of the center portion 32. The top of the central portion is curved about an axis extending longitudinally of the panel into a roof portion 36 that forms an edge portion of the automobile roof. It is desirable to have the roof portion covered by a portion of coating having maximum thickness yet sufficiently transparent to light to permit vision therethrough, and the center portion 32 includes an upper portion 33 provided with a coating tapering in thickness downwardly from the roof portion until the coating is nonexistent about midway down the panel to provide a clear portion 35 extending horizontally below the upper portion 33.

Such a panel may be formed by heating a sheet of glass and by means of a spray gun 26 immediately spraying the heated glass sheet with a solution of a metallic salt that provides a metal oxide coating having a heat shielding effect. When the panel 30 is oriented so that its convex surface is exposed to the spray, it is important that the relative positions of the panel and the spray be such that the roof portion 36 is aligned with the dense region 23 of the spray, the upper portion 33 aligned with sparse spray region 25 and clear portion 35 maintained out of contact with the spray, as the panel is passed through the spray. Alternatively, the spray guns may be moved relative to the fixed, heated base to provide the necessary relative motion. In either event, it is necessary that each increment of panel 30 be exposed to the spray for a limited time. This exposure should cease before the temperature of any portion of the increment falls below the minimum film forming temperature to insure that the metal oxide film resulting from the exposure of the heated base to the spray composition is graded in the desired configuration.

Care must be taken to insure that the leading and trailing edge effects described in Lytle Patent No. 2,724,658, dated November 22, 1955, are eliminated. This can be accomplished by lengthening the period of dwell of the spray upon the leading and trailing edges of the heated base compared to the period of dwell of the intermediate increments, either by decelerating the rate of movement of the leading and trailing edges of the panel through the spray or rotating the spray gun in the direction of movement of the panel through the spray. However, the period of a single exposure of any increment of the panel to the spray should be limited by the criteria above.

Since the thickness of the spray determines the transparency of the film formed, a coating having a density pattern substantially uniform along the axis of relative movement between a sheet and the spray and which varies along the axis perpendicular to the axis of relative movement is produced. If the density of such a film is insufficient because of the time of exposure limitations stated above, the coating procedure may be repeated by reheating the coated panel and subjecting it to another spraying operation. If more than one coating is required to secure the proper density of film, more uniform coatings along the axis of relative movement may be obtained by reversing the leading and trailing edges of the plate exposed to the spray for the second spraying.

Figure 3:
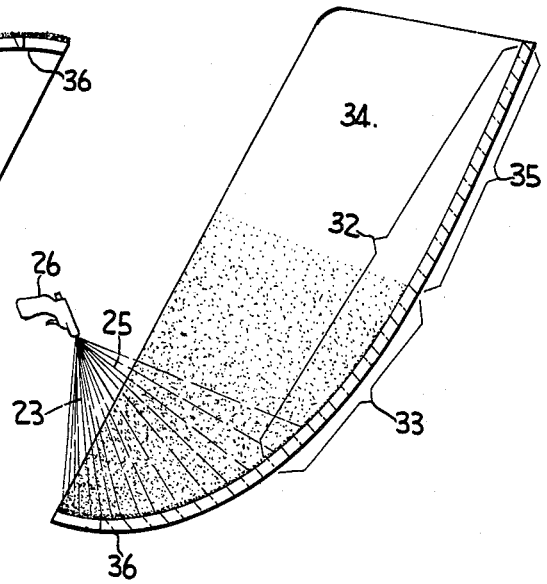
FIG. 3 is a cross-sectional view of a panel showing how it is oriented to provide thereon a film of feathered thickness when the panel is treated with the spray pattern of FIG. 2.

Another method of producing such a graded film involved placing the windshield in an upside down position (FIG. 3) so that the roof portion 36 was at the bottom and the concave surfaces of the panel 30 exposed to the spray. The latter was applied in the form shown in FIG. 3 with the dense region 23 striking the roof portion 36, the sparse region 25 striking strip 33 of the panel and panel strip 35 kept beyond the limits of the spray. The film formed by this method is on the inside surface of the automobile light and therefore is not exposed to weather and other elements that might tend to deteriorate the film.

EXAMPLE

A precut flat sheet of glass 14 inches wide, 42 inches long and ¼ inch thick was mounted on a glass bending mold of the female skeleton type having upper shaping surfaces conforming in outline and elevation to the contour desired for the glass. The sheet and the mold were placed on a carriage. The mold laden carriage was kept in a horizontal furnace for five minutes and 30 seconds, during which time the heated glass sagged by gravity into conformity with the mold shaping surface. The bent glass was passed horizontally beneath a spray provided by a spray gun oriented at an angle of 30 degrees downwardly and directed transversely of the horizontal path of movement of the glass relative to the spray gun. The spray was tapered in density and oriented to impart its thick region along a longitudinal edge of the bent glass sheet and the feathered edge of the thin region of the spray aligned with the portion of the sheet where the coating was desired to end. The glass was conveyed past the oriented spray gun at a distance of about 4 inches measured along the central axis of the spray. The air pressure for the spray gun was about 60 p.s.i. with the spray solution fed by gravity to the spray gun.

The spray solution formed an oxide coating consisting essentially of an antimony oxide—tin oxide mixture where the antimony constituted 20 percent by weight of the total weight of tin plus antimony. The formulation of the spray solution was: 151 grams $H_2O$, 30 grams concentrated HCl, 146 grams $SnCl_4$, 31 grams $SbCl_3$.

The transmission percentages to visible light of the various points of the sprayed plate along different longitudinal axes were as follows:

TABLE OF LOCALIZED LIGHT TRANSMISSIONS

Top Edge

| Leading Edge | | | | | | | Trailing Edge |
|---|---|---|---|---|---|---|---|
| | 10% | 6% | 8% | 14% | 20% | 30% | |
| | 40% | 20% | 15% | 31% | 32% | 46% | |
| | 77% | 60% | 46% | 68% | 74% | 78% | |
| | 85% | 79% | 70% | 74% | 82% | 82% | |
| | 89% | 87% | 81% | 83% | 85% | 85% | |
| | 89% | 87% | 87% | 85% | 87% | 87% | |

Bottom Edge

The film development was not as strong at the trailing edge of the panel as at the leading edge or center. This result points up the necessity for increasing the exposure time of the trailing increments of the panel to the film forming spray when large panels are coated within the limits of the present invention. This can be accomplished either by rotating the spray gun in the direction of panel movement or slowing down the relative motion of the trailing increments of the panel past the spray. The panel must move at a minimum velocity or higher velocity relative to the spray so that each increment thereof leaves the spray before the temperature of any portion thereof falls below minimum film forming temperature.

Of course, the same result may be accomplished by exposing the filmed base to heat and a second spraying wherein the trailing edge for the first coat is the leading edge for the second coat.

The sheets so coated may be utilized as window panels or may be fabricated into safety glass assemblies. The latter operation involves bending at least two sheets of glass into the desired configuration, imparting a coating according to the principles enunciated above to at least one of the glass sheets and bonding the sheets to opposite surfaces of a sheet of transparent plastic material, such as polyvinyl butyral.

Obvious modifications of the techniques may be made within the scope of the following claims. In imparting coatings of varying thickness to small sheets, the entire sheet may be treated as an increment.

What is claimed is:

1. A window closure comprising an elongated sheet of glass provided with a main portion curving adjacent each longitudinal extremity about an axis extending transversely of said sheet to form wing portions extending in one direction from the longitudinal extremities of said main portion and curving adjacent one side about an axis extending longitudinally of said sheet to form an upper portion extending in said one direction from the main portion in a plane angularly disposed to said wing portions, a light and heat-screening coating of nonuniform thickness integrally united directly with the glass surface but not intermingled with the glass, said coating consisting essentially of a metal oxide sufficiently transparent to light to permit vision therethrough throughout its extent and having relatively low transparency to light and heat in said upper portion and decreasing in thickness downwardly from a section of said upper portion to provide a heat screen of gradually increasing transparency to light and heat along an axis transverse to the longitudinal axis of said sheet in the plane of the coated surface extending between the wing portions, but of substantially uniform thickness along any longitudinal axis, and a portion below said coated upper portion essentially free from said coating to permit clear vision therethrough and having its said surface in essence electrically nonconductive.

2. A curved window closure as in claim 1, wherein said metal oxide coating contains cobalt oxide as an essential light and heat screening ingredient.

3. A window closure comprising an elongated sheet of glass provided with a main portion curving adjacent each longitudinal extremity about an axis extending transversely of said sheet to form wing portions extending in one direction from each longitudinal extremity of said main portion, a light and heat-screening coating of nonuniform thickness integrally united directly with the glass surface at the upper portion of said main portion but not intermingled with the glass, said coating consisting essentially of a metal oxide sufficiently transparent to light to permit vision therethrough throughout its extent and having relatively low transparency in light and heat in said upper portion and decreasing in thickness away from a section of said upper portion to provide a light and heat screen of gradually increasing transparency to light and heat along an axis transverse to the longitudinal axis of said sheet in the plane of the coated surface extending between the wing portions, but of substantially uniform thickness along any longitudinal axis, and a portion below said coated upper portion essentially free from said coating to permit clear vision therethrough and having its said surface in essence electrically nonconductive.

4. A curved window closure comprising a curved transparent sheet of glass having an upper portion and a lower portion, and a light and heat-screening coating of nonuniform thickness integrally united directly with the glass surface but not intermingled with the glass, said coating consisting essentially of a metal oxide sufficiently transparent to light to permit vision therethrough throughout its extent and having relatively low transparency to light and heat in said upper portion and decreasing in thickness away from a section of said upper edge to provide a light and heat screen of gradually increasing transparency to light and heat from said section along a first axis extending from said upper portion toward said lower portion in the plane of the coated surface but of substantially uniform thickness along any axis extending substantially horizontally of said sheet, said lower portion being essentially free from said coating to permit clear vision therethrough and having its said surface in essence electrically nonconductive.

5. A window closure as in claim 4, wherein said upper portion is disposed at a relatively large angle to a vertical plane and said lower portion is disposed at a relatively small angle to a vertical plane.

6. A vehicle window closure as in claim 5, wherein said metal oxide coating contains cobalt oxide as an essential light and heat screening ingredient.

7. A window closure as in claim 4, wherein said metal oxide coating contains cobalt oxide as an essential light and heat screening ingredient.

References Cited by the Examiner

UNITED STATES PATENTS

| | | | |
|---|---|---|---|
| 1,176,313 | 3/1916 | Pfund | 156—100 X |
| 1,805,969 | 5/1931 | Bostrom | 156—100 X |
| 1,865,691 | 7/1932 | Hill | 88—108 X |
| 1,990,143 | 2/1935 | Snow | 117—33.3 |
| 2,409,356 | 10/1946 | Hutchings | 88—108 |
| 2,564,708 | 8/1951 | Mochel | 117—33.3 |
| 2,569,773 | 10/1951 | Orr | 117—124 |
| 2,593,525 | 4/1952 | Beckham | 88—108 X |
| 2,636,420 | 4/1953 | Ryan et al. | 88—108 X |
| 2,675,740 | 4/1954 | Barkley | 88—108 X |
| 2,676,114 | 4/1954 | Barkley | 117—33.3 X |
| 2,688,565 | 9/1954 | Raymond | 117—54 X |
| 2,689,803 | 9/1954 | Ackerman | 117—211 |
| 2,691,323 | 10/1954 | Raymond | 117—54 X |
| 2,715,046 | 8/1955 | Ackerman | 117—211 |
| 2,724,658 | 11/1955 | Lytle | 117—211 |
| 2,808,351 | 10/1957 | Colbert et al. | 117—33.3 X |
| 2,954,454 | 9/1960 | Gaiser | 117—211 X |
| 3,019,135 | 1/1962 | Orr | 117—54 X |

FOREIGN PATENTS

| | | |
|---|---|---|
| 686,167 | 1/1953 | Great Britain. |
| 153,241 | 9/1953 | Australia. |
| 704,793 | 3/1954 | Great Britain. |

JOSEPH B. SPENCER, *Primary Examiner.*

RICHARD D. NEVIUS, *Examiner.*